Aug. 20, 1957 H. T. HALIBRAND 2,803,314
WHEEL ASSEMBLY AND BRAKE UNIT
Filed Jan. 15, 1954 2 Sheets-Sheet 1

Fig. 1.

Fig. 2.

INVENTOR.
HENRY T. HALIBRAND,
BY
Wm. H. Maxwell Jr.
AGENT.

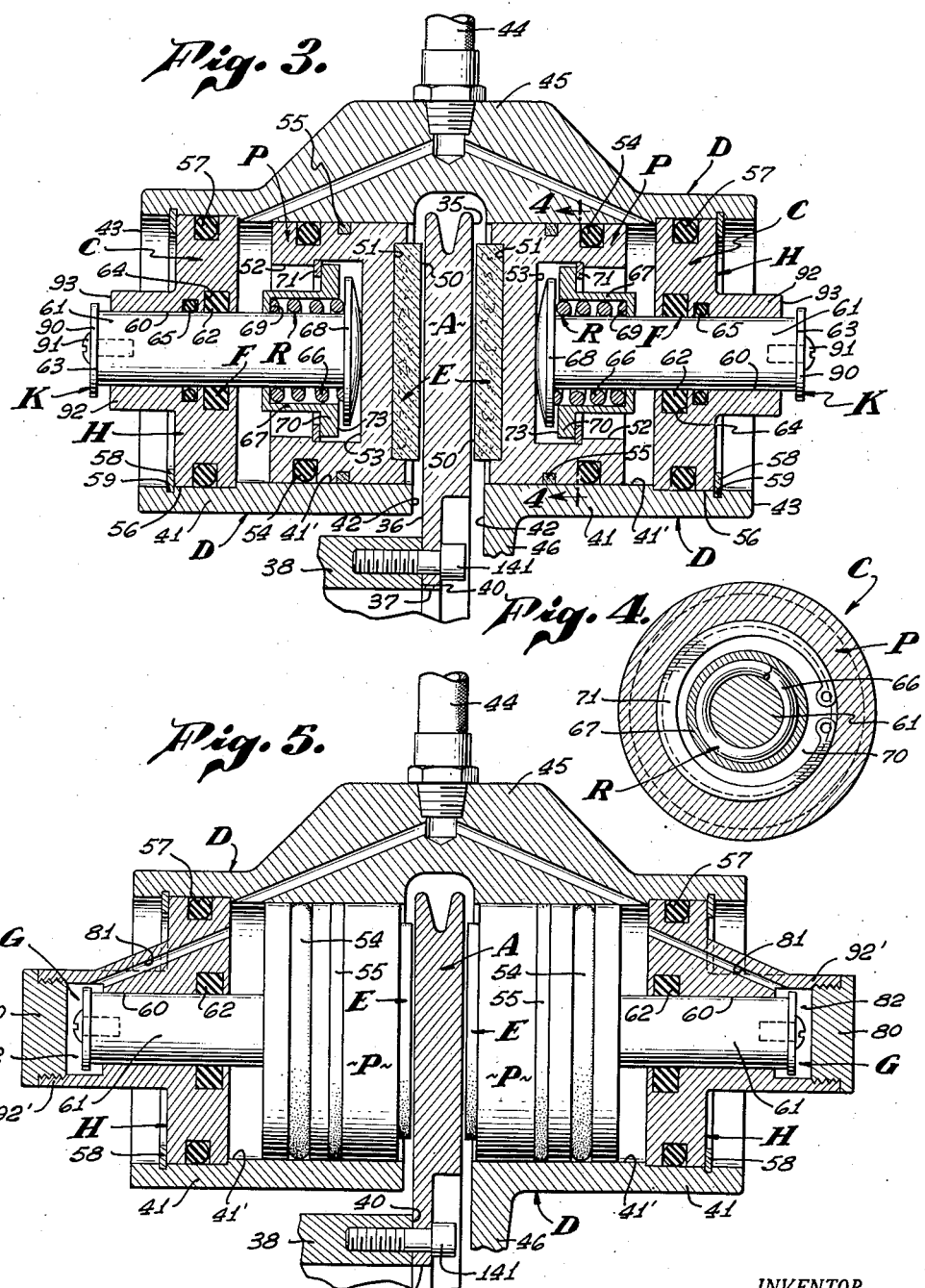

United States Patent Office 2,803,314
Patented Aug. 20, 1957

2,803,314

WHEEL ASSEMBLY AND BRAKE UNIT

Henry T. Halibrand, Culver City, Calif.

Application January 15, 1954, Serial No. 404,205

5 Claims. (Cl. 188—152)

This invention relates to a wheel assembly and brake unit for vehicles, for instance motor vehicles, and it is a general object of the invention to provide a simple, practical, improved wheel assembly construction, and an improved and dependable brake unit which is particularly adapted to check rotation of an axle or wheel.

It is an object of this invention to provide a wheel assembly construction of the character referred to which is particularly adapted to cooperate with a disc brake, or the like, and which provides for adequate air circulation around the braking elements.

Another object of this invention is to provide a simple and inexpensive brake unit of the character referred to which is easily manufactured and is particularly adapted to be used in connection with disc brakes.

It is a further object of this invention to provide a brake unit for use in a wheel assembly of the character referred to which is provided with a dependable and positive return means, so that the braking elements do not frictionally engage when the brake is released.

It is a further object of this invention to provide a brake unit for use in a wheel assembly of the character referred to which is provided with a dependable and positive adjusting means and which acts to periodically adjust the position of the braking element as the braking element wears during its operational life. By the means that I have provided the braking elements are accurately adjusted and maintained in proper working position at all times.

It is an object of this invention to provide a stop for the movable braking elements which prevents the metallic parts of the structure from coming together and which indicates the extent to which the brake has been worn.

It is still another object of this invention to provide a wheel assembly and brake unit of the character referred to which incorporates a pressure boosting means that utilizes the entire force of the hydraulic pressure which is admitted to the braking cylinder that I have provided.

It is still another object of this invention to provide a brake unit for use in a wheel assembly of the character referred to which unit can be easily and quickly assembled, or disassembled, as circumstances require.

The structure which is provided by the present invention includes, generally, a wheel assembly which involves an axle, a housing rotatably supporting and carrying the axle, and a wheel detachably secured to the end of the axle. The brake structure which characterizes the present invention includes a simple disc element which is secured to and rotates with the wheel, and one or more pairs of opposed hydraulically operated braking units. Each braking unit is characterized by a brake block which is adapted to engage the brake disc, a piston which is slidably carried in a cylindrical bore and carries the brake block, and a stem which projects rearwardly from the piston and is adjustably anchored in a cylinder head. The stem and piston are yieldingly coupled together by means of a spring and the stem in anchored in the head by means of a snubber which yieldingly and frictionally engages with the stem. A pressure boosting means is provided which means by-passes fluid pressure from within the cylinder so that the pressure acts on the rearward end of the stem with the result that the entire cross sectional area of the cylinder is effective to actuate the piston.

The various objects and features of my invention will be fully understood from the following detailed description of typical preferred forms and applications of my invention, throughout which description reference is made to the accompanying drawings, in which:

Fig. 1 is an elevational view of the wheel assembly and brake unit that I have provided, showing the axle in section. Fig. 2 is a transverse sectional view of a portion of the structure shown in Fig. 1, being a view taken as indicated by line 2—2 on Fig. 1. Fig. 3 is a transverse sectional view of a portion of the structure shown in Fig. 1, taken as indicated by line 3—3 on Fig. 1. Fig. 4 is a sectional view through the piston of one of the brake units taken as indicated by line 4—4 on Fig. 3, and Fig. 5 is a view similar to Fig. 3, showing a second form of the invention.

The wheel assembly that I have provided involves an axle X, a housing Y and a wheel Z. The axle X is an elongate element 10 that is preferably tubular in cross section. The element 10 carries a hub 11 which hub has an outer wheel carrying portion 12, an inner bearing portion 13 and an intermediate flange 14. A cap screw 15, or the like, may be provided to secure the hub 11 on the end of the axle, as shown.

The outer wheel carrying portion 12 has external threads 16 and has a shoulder 17 which is adapted to receive and center the wheel Z. The inner bearing portion 13 has a bearing face 18 adapted to receive the inner race of anti-friction bearing, such as a ball bearing unit 19, or the like. A suitable shoulder is provided to locate the unit 19 on the hub 11, and a retainer ring is provided to hold the unit 19 in place. The flange 14 carries a plurality of circumferentially spaced drive pins 20 which project outwardly from the flange and are adapted to provide driving engagement between the axle X and the wheel Z.

The housing Y is in the nature of a cylindrical element 121 and is adapted to rotatably support and carry the axle X. The housing Y has a bearing face 21 adapted to receive the outer race of the anti-friction bearing unit 19. A suitable shoulder is provided to locate the unit 19 within the housing Y, and a retainer ring is provided to hold the outer race of the unit 19 in place. As shown in Fig. 2 of the drawings, inner and outer dust seals 22 and 23 are provided which engage with the rotating elements of the axle X to prevent entry of foreign matter into the bearing unit 19.

The bearing unit 19 is engaged between the faces 18 and 21 and rotatably carries the axle X within the housing Y. It is to be understood, however, that a plurality of bearing units 19 may be provided to carry an elongate spindle in place of the axle X, which spindle construction may be characteristic of the front axle construction of a motor vehicle.

The wheel Z is a disc-shaped element which is carried by the hub 11 at the outer end of the axle X and is characterized by a web 25 in a plane normal to the axis of the axle X, an annular rim 26, and a central bore 27 adapted to be slidably engaged and centered on the shoulder 17. A plurality of circumferentially spaced drive openings 28 are provided in the web 25 of the wheel Z, which openings are adapted to register and cooperate with the pins 20 to have driving engagement therewith. A knock-off lug 30 and plate 31 may be provided to secure the wheel Z to the axle X. The lug 30 has internal threads 32 which engage with the threads 16 hereinabove described. The lug 30 has clamping engagement with the plate 31 and thereby forces the web 25 of the wheel into tight engagement with the flange 14.

The brake assembly with which this invention is concerned is preferably referred to as a disc brake assembly, and as shown throughout the drawings involves, generally, a brake disc A and one or more pairs of opposed brake units C. The brake disc A is rotatably carried by the housing Y and has driving connection with the axle X and wheel Z. The opposed brake units C are fixed against rotation and, as shown, are carried by the housing Y.

As illustrated in Fig. 1 of the drawings, a radius rod S is connected with the housing Y by means of pins 33. The pins 33 are on a common axis, which axis is preferably normal to and intersects the axis of the axle X. The radius rod S is an elongate element and extends laterally of the axle X and is anchored to the frame of the vehicle. The particular construction referred to is common in motor vehicles, such as racing cars or the like, and serves to anchor the wheel housing against rotation and against forward and aft movement.

The brake disc A is a simple, flat, circular part having spaced parallel braking faces 35 and 36 which are machined flat and smooth. The brake disc A is carried at the inner side of the wheel Z and preferably surrounds the housing Y. The brake disc has an inner wall 37 which forms an opening for passing the housing Y. A cylindrical bracket 38 is provided and carries the brake disc A in spaced relationship to the wheel Z and in a plane normal to the axis of the axle X. As shown throughout the drawings, the disc A is carried adjacent the inner end of the housing Y. The bracket 38 has an inwardly turned base 39 at its outer end, which base is fastened to the flange 14 by means of the pins 20. The disc A is secured to the flat inner end face 40 of the bracket 38 by means of an annular series of fasteners 141.

The brake units C of the present invention are related to the disc A in opposed pairs, there being a unit C at each side of the disc A. I have shown two pairs of brake units C, the units C of each pair engaging the opposite brake faces 35 and 36. As illustrated, the brake units C of one pair are carried on a common axis which is normal to and intersects the plane of the faces 35 and 36, and is parallel to and spaced from the axis of the axle X.

The units C are carried in cylinders D and each cylinder involves an elongate body 41 that is round in cross section and which is concentric with the axis of the unit C carried thereby. Each cylinder D has a cylindrical bore 41' extending concentrically through the body 41 from the front end 42 to the back end 43. The bore 41' is smooth and is adapted to slidably receive a unit C. A pressure supply line 44 communicates with the chamber formed by the cylinder D so that fluid pressure is directed into the chamber behind the piston of the unit C.

Since there is a brake unit C at each side of the brake disc A, I have provided a cylinder D at each side of the brake disc. A beam 45 extends between and ties the cylinders D together so that a cylinder D occurs at each side of the disc. The pair of cylinders thus provided is held in position by an arm 46 that projects radially from the housing Y to carry the brake units C. The arm 46 may be coupled to the housing Y through a plate member 47 which is releasably secured to the housing by means of suitable screw fasteners 48. As shown in the drawings, the bodies 41 of the cylinders D may be integrally formed with the plate 47.

Each unit C involves, generally, a brake block E adapted to frictionally engage the disc A, a piston P carrying the brake block for engagement with the disc A, a cylinder head H which closes the rear end of the cylinder D, and adjusting means F which properly positions the brake block E, a stop means K which limits the action of the means F, a return means R for retracting the brake block from engagement with the brake disc A, and a pressure boosting means G.

The brake block E is a simple, circular disc or biscuit of brake lining material having the desired characteristics for developing friction between the unit C and the brake disc A. The brake block has a flat front face 50 which is smooth and is adapted to engage with the disc face 35 or 36.

The piston P is a simple, cylindrical part which is adapted to be slidably carried in the bore 41' of the cylinder D. The piston P has a cylindrical recess 51 in its front face and has a cylindrical socket 52 in its back face. The recess 51 receives and carries the brake block E which block may be secured in the recess by means of cement, or the like. The socket 52 terminates in a flat bottom face 53 and an O-ring seal 54 and a suitable wiper ring 55 is carried in the periphery of the piston to have sealing and wiping engagement with the cylindrical bore 41'.

The cylinder head H is a simple disc-shaped part having a cylindrical outer wall 56 carrying an O-ring seal 57 which has sealing engagement with the bore 41'. The head H is slidably received in the bore 41' and is retained therein by means of a snap ring 58 which is engaged in a groove 59. The head H seats against a shoulder in the bore 41' and has a central bore 60 which passes parts of the adjusting means F, hereinafter described.

The adjusting means F acts to position the piston P longitudinally of the bore 41 and includes, generally, a stem 61 that projects rearwardly from the piston P and a snubber 62 which adjustably and frictionally anchors the stem. The stem 61 is a simple, elongate, cylindrical part and has a smooth exterior which extends through the bore 60 and terminates in a flat end 63. The snubber 62 is an annular ring of rubber, or like material, which is carried in an annular channel 64 in the bore 60 and surrounds the stem 61. The snubber 62 fills the channel 64 and has tight engagement with the stem 61. An O-ring seal 65 is provided in the bore 60 to seal around the stem at the head H. The snubber 62 acts to yieldingly hold the stem and engages the stem frictionally to allow for shifting of the stem longitudinally of the bore 41' as the brake block E wears.

The stop means K acts to limit movement of the stem 61 and prevents the front of the piston P from engaging the disc A. As illustrated, the means K involves a stop washer 90 secured to the end 63 of the stem 61 by a suitable screw fastener 91. The washer is of larger diameter than the stem and overlies the end of the stem. A boss 92 is provided on and projects from the rear face of the head H and terminates in a stop face 93 that is normally spaced from the washer 90. It will be understood how the spacing may be made so that the washer engages the stop face before the body of the piston P engages disc A. Thus the brake block E can wear without danger of the metallic parts coming together in a manner to cause damage.

The return means R allows the piston P to move forward so that the brake block E frictionally engages the brake disc A, and yieldingly urges the piston P back to the normal position as governed by the adjusting means F. The return means R involves a spring 66 carried in a cage 67. The spring 66 is a compression spring and has its forward end in engagement with a head 68 on the forward end of the stem 61. The rearward end of the spring 66 acts against a seat 69 in the cage 67. The cage 67 has a flange 70 engageable within the socket 52 and is retained therein by means of a snap ring 71 which engages a shoulder in the socket 52. The front face 73 of the flange 70 has a stop face which is normally spaced from and is adapted to have stopping engagement with the back side of the head 68. The front face of the head 68 is convex and provides for a single point of engagement with the bottom face 53 when the piston is retracted, as shown throughout the drawings.

The pressure boosting means G which I have provided acts to increase the effective pressure on the brake block E and involves, generally, a closure 80, and a pressure by-pass 81. The closure 80 is screw threaded into the outer end of a boss 92' on the head H and forms a chamber 82 which is an enlarged continuation or counterbore of the bore 60. The chamber 82 receives the rearward end of the stem 61. By providing the chamber 82 and the by-pass 81 pressure within the cylinder D is communicated to the chamber so that fluid pressure acts upon the entire cross sectional area of the bore 41' thereby forcing the brake block E into pressure engagement with a maximum amount of braking force.

It will be apparent from the foregoing that I have provided a wheel assembly and brake unit which acts to brake or check rotation of a rotating element, such as a wheel. When pressure is applied to the brake cylinder D the piston P is moved forward so that the brake block E engages the brake disc A. The spring 66 is compressed and when the pressure is released the spring yieldingly urges the piston and brake block back to a normal position where the brake block is spaced from the disc A. It will be observed that the return means R has a limited travel, and when this travel is exceeded the forward movement of the piston P draws the stem 61 frictionally through the snubber ring 62 thereby properly positioning the stem. As the brake block E wears over a period of time the stem 61 will be re-positioned from time to time.

Having described only typical preferred forms and applications of my invention, I do not wish to be limited or restricted to the specific details herein set forth, but wish to reserve to myself any variations or modifications that may appear to those skilled in the art and fall within the scope of the following claims.

Having described my invention, I claim:

1. A brake unit for use in a brake cylinder, including, a piston slidably carried in the forward end of the cylinder, a brake block on the front of the piston and projecting from the front end of the cylinder, a cylinder head closing the rear end of the cylinder and having a bore therethrough with an annular channel thereon, an adjusting means positioning the piston and block longitudinally of the cylinder including a stem projecting rearwardly from the piston and extending through the bore, and an annular ring of rubber-like material carried in the channel and of predetermined cross section and surrounding the stem and frictionally positioning it, and a return means yieldingly coupling the piston and stem including, a cage carried by the piston and surrounding the stem, and a spring in the cage and surrounding the stem to yieldingly urge the piston rearwardly, and a pressure boosting means including, a closure forming a chamber that receives the end of the stem, and a passage interconnecting the chamber with the interior of the cylinder.

2. A brake unit for use in a brake cylinder, including, a piston slidably carried in the forward end of the cylinder, a brake block on the front of the piston and projecting from the front end of the cylinder, a cylinder head closing the rear end of the cylinder and having a bore therethrough with an annular channel therein, an adjusting means positioning the piston and block longitudinally of the cylinder including a stem projecting rearwardly from the piston and extending through the bore, and an annular ring of rubber-like material carried in the channel and of predetermined cross section and surrounding the stem and frictionally positioning it, a return means yieldingly coupling the piston and stem including, a cage carried by the piston and surrounding the stem, and a spring in the cage and surrounding the stem and acting to yieldingly urge the piston rearwardly, a stop on the rear end of the stem engageable with the head to limit forward movement of the piston, and a pressure boosting means including, a closure forming a chamber that receives the end of the stem, and a passage interconnecting the chamber with the interior of the cylinder.

3. A brake unit of the character described including, an elongate brake cylinder, a piston slidably carried in the cylinder, a brake block on the front of the piston and projecting from the front end of the cylinder, a cylinder head closing the rear of the cylinder and having a bore therethrough with an annular channel therein, an adjusting means positioning the piston and block longitudinally of the cylinder including, a stem projecting rearwardly from the piston and extending through the bore, and a snubber ring carried in the channel in the bore and engaging the stem, and a pressure boosting means including, a closure forming a chamber that receives the end of the stem, and a passage interconnecting the chamber with the interior of the cylinder.

4. In combination, a wheel assembly including, a fixed housing, an axle rotatably carried by the housing, and a brake disc having driving engagement with the axle and surrounding the housing, and a brake unit carried by the housing and including, an elongate brake cylinder, a piston slidably carried in the cylinder, a brake block on the front of the piston and projecting from the front end of the cylinder, a cylinder head closing the rear of the cylinder and having a bore therethrough with an annular channel therein, an adjusting means positioning the piston and block longitudinally of the cylinder including, a stem projecting rearwardly from the piston and extending through the bore, and a snubber ring carried in the channel in the bore and engaging the stem, and a pressure boosting means including, a closure forming a chamber that receives the end of the stem, and a passage interconnecting the chamber with the interior of the cylinder.

5. In combination, a wheel assembly including, a fixed housing, an axle rotatably carried by the housing, and a brake disc surrounding the housing in a plane normal to the axis of the assembly, and a brake unit carried by an arm projecting from the housing and including, a pair of spaced opposed cylinder units adapted to frictionally engage the sides of a brake disc, each cylinder unit including, an elongate brake cylinder, a piston slidably carried in the cylinder, a brake block on the front of the piston and projecting from the front end of the cylinder, a cylinder head closing the rear of the cylinder and having a bore therethrough with an annular channel therein, an adjusting means positioning the piston and block longitudinally of the cylinder including, a stem projecting rearwardly from the piston and extending through the bore, and a snubber ring carried in the channel in the bore and engaging the stem, and a pressure boosting means including, a closure forming a chamber that receives the end of the stem, and a passage interconnecting the chamber with the interior of the cylinder.

References Cited in the file of this patent

UNITED STATES PATENTS

| | | |
|---|---|---|
| 2,051,286 | Boykin | Aug. 18, 1936 |
| 2,196,930 | Loweke | Apr. 9, 1940 |
| 2,392,970 | Bricker | Jan. 15, 1946 |
| 2,568,858 | Kovac | Sept. 25, 1951 |
| 2,644,549 | Cagle | July 7, 1953 |
| 2,657,772 | Chamberlain | Nov. 3, 1953 |
| 2,672,220 | Collier | Mar. 16, 1954 |
| 2,682,320 | Chamberlain | June 29, 1954 |